United States Patent
Gleixner et al.

[11] Patent Number: 5,453,646
[45] Date of Patent: Sep. 26, 1995

[54] NOISE-DAMPED BRUSH MOUNT, ESPECIALLY FOR SMALL COMMUTATOR MOTORS

[75] Inventors: Ronald Gleixner, Ochsenfurt; Christoph Pitsch, Höchberg, both of Germany

[73] Assignee: Siemens Aktiengesellschaft, München, Germany

[21] Appl. No.: 117,475

[22] Filed: Sep. 7, 1993

[30] Foreign Application Priority Data

Sep. 7, 1992 [EP] European Pat. Off. ............ 92115287

[51] Int. Cl.[6] .................................................. H02K 5/24
[52] U.S. Cl. ................. 310/51; 310/43; 310/89; 310/91; 310/239
[58] Field of Search .................. 310/51, 239, 242, 310/42, 40 MM, 248, 249, 72, 91, 254, 43, 233, 89

[56] References Cited

U.S. PATENT DOCUMENTS

| | | | |
|---|---|---|---|
| 2,098,073 | 11/1937 | Tucker | 310/51 U X |
| 3,824,416 | 7/1974 | van de Griend | 310/51 |
| 3,990,141 | 11/1976 | Stark | 310/42 |
| 4,324,997 | 4/1982 | Taylor | 310/248 |
| 4,550,268 | 10/1985 | Becker | 310/72 |
| 4,614,889 | 9/1986 | Ikegami | 310/51 |
| 4,758,757 | 7/1988 | Okumura | 310/51 |
| 4,921,371 | 5/1990 | Boireau | 310/51 U X |
| 5,208,499 | 5/1993 | Barber | 310/51 |
| 5,231,322 | 7/1993 | Richards | 310/51 |

FOREIGN PATENT DOCUMENTS

| | | |
|---|---|---|
| 0076403 | 4/1983 | European Pat. Off. . |
| 1531027 | 5/1968 | France . |
| 2140491 | 1/1973 | France . |
| 2249468 | 5/1975 | France . |
| 2441943 | 6/1980 | France . |
| 2627821 | 9/1989 | France . |
| 1613985 | 6/1971 | Germany . |
| 3904844 | 9/1989 | Germany . |

*Primary Examiner*—R. Skudy
*Attorney, Agent, or Firm*—Kenyon & Kenyon

[57] ABSTRACT

A high degree of freedom from noise is possible with a simple manufacturing technique for a small commutator motor by virtue of the fact that brush boxes are permanently mounted on parts of a brush plate and lockable by molded locking pins in locking openings of a base mounted on a motor housing with a gap therebetween. Damping sleeves may be premounted into the base edgewise with through openings for locking pins.

20 Claims, 3 Drawing Sheets

5,453,646

NOISE-DAMPED BRUSH MOUNT, ESPECIALLY FOR SMALL COMMUTATOR MOTORS

BACKGROUND OF THE INVENTION

The present invention relates to a noise-damped brush holder, especially for small commutator motors, in which the holder includes a brush mount having brush boxes mounted in a brush plate with brushes disposed therein.

German Patent Document No. DE-U-81 28 614 and corresponding European Patent Document No. EP-A1-00 76 403 disclose a noise-damped brush mount for a commutator motor, in which the individual brush housings guiding the brushes are each mounted independently on a brush plate with a damping plate interposed therebetween. The brush plate accepts additional electronic and/or electrical components and is mounted directly on the motor housing. The brushes are each mounted diagonally at an angle of incidence that differs from the perpendicular to the surface of the commutator, in such fashion that in view of a leg spring pressing on one beveled end of the brush and in view of the operational frictional force between the carbon brush and the surface of the commutator on the one hand and the pressure applied by the leg spring on the other, the brush abuts one side wall of the brush housing receiving it in a fixed position over its entire radial length, regardless of the rotational direction of the commutator.

French Patent Document Nos. FR-A-22 49 468 and FR-A-26 27 821 (the latter of which corresponds to U.S. Pat. Document No. US-A-4,921,371 and German Patent Document No. DE-A-39 04 844) disclose mounting a brush holder plate on a motor end shield using damping elements.

These prior designs are complex to manufacture in that they rely on complicated arrangements of damping elements to reduce the effects of noise.

SUMMARY OF THE INVENTION

The present invention addresses this deficiency of the known systems. Accordingly, it provides a brush mount, which better ensures a high degree of noise damping, especially in small commutator motors, and is also simpler to manufacture while ensuring reliable and simple contact with terminals for an external supply line and/or additional electrical components.

In an embodiment of the present invention a noise damped brush mount for a small commutator motor that has a stator in a housing, includes a base permanently mounted on the stator part. Furthermore, a brush plate is mounted on the base with a damping insert therebetween. Brush boxes are mounted directly on the brush plate and a brush is mounted in each of the brush boxes.

The brush mount according to the present invention permits, in simple fashion, a definite immobilization, ensured even over long operating times, of the brush box and thus of the brushes relative to the commutator by mounting the brush boxes on the brush plate without an elastic damping insert. It also ensures a high degree of freedom from noise with very simple assembly during manufacture and good positioning by noise-damping mounting of the brush plate on the base which serves for permanent mounting in the motor. Connectors for supply lines and mounts for additional electrical components can be stably mounted on the base. In this way, the ability of stresses to affect the position of the brushes in an unfavorable manner during the mounting of these components and/or the plugging in of an external connector is reliably prevented.

To achieve an assembly that is advantageous from the manufacturing standpoint, for mutually spaced and noise-damping mounting between the brush plate on the one hand and the body on the other, opposing axially lockable locking and snap connections ensure axial spacing in particular, and opposing axially interlocking guide connections ensure preferably opposing radial and/or tangential alignment. Thus, according to one embodiment of the present invention, the brush plate is lockable and/or insertable by means of respectively axially integrally formed, laterally elastically deformable locking pins inserted into corresponding guide openings and/or by means of solid guide pins inserted into corresponding guide openings of the base, with interposition of damping sleeves fitting around the locking pins and/or guide pins. The damping sleeves are provided with through openings for the locking pins and guide pins are advantageously premountable in the locking or guide openings.

The damping sleeves act as axial spacers between the brush plate and the base, whereby as a result of the positive locking connection between the brush plate and the base, their axial spacing, for example over the length of the locking pins or by provision of locking means, a pretensioning of the elastic damping sleeves can be adjusted in simple fashion to produce a specific damping.

BRIEF DESCRIPTION OF THE DRAWINGS

The present invention, as well as additional advantageous embodiments of the invention, will now be explained in greater detail with reference to the drawings.

DETAILED DESCRIPTION

Figure 2:
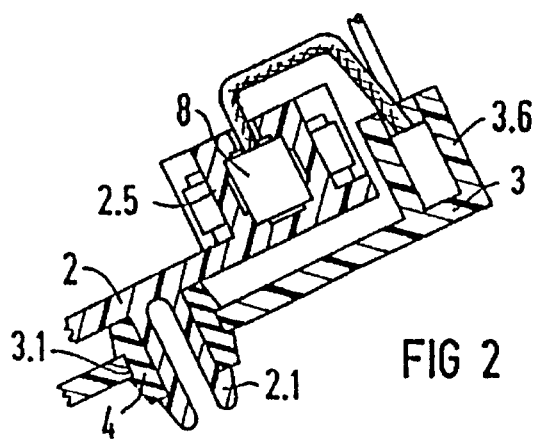
FIG. 2 shows a detailed cross section along line II—II in FIG. 1.
Figure 1:
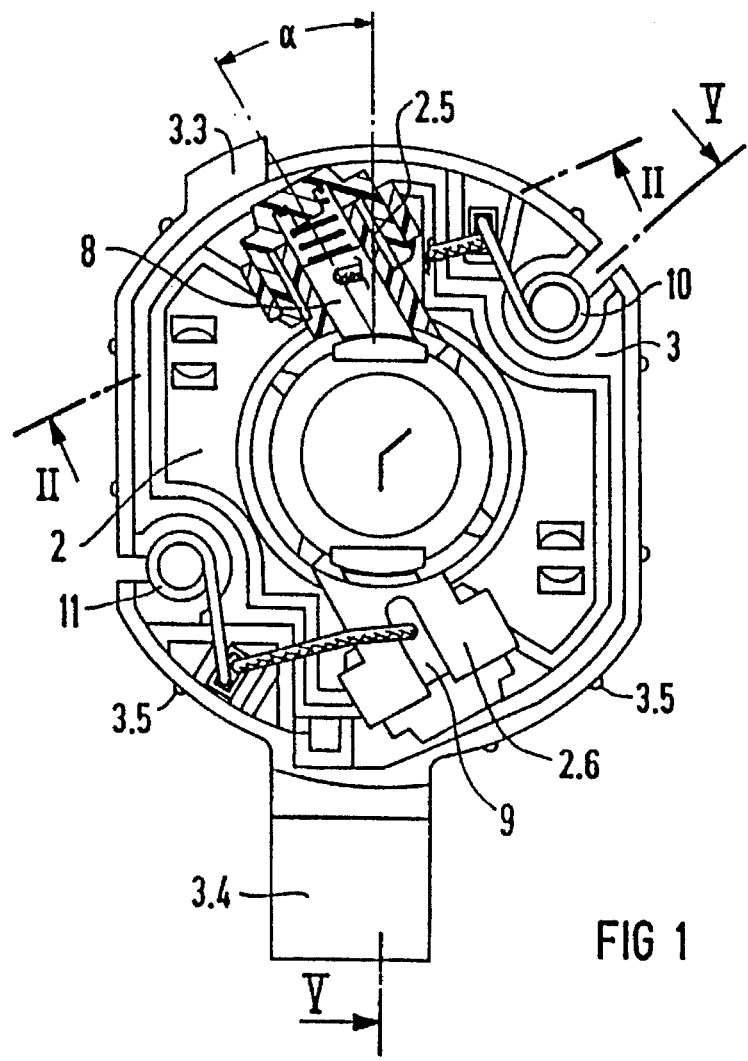
FIG. 1 shows an axial top view of a brush mount in an embodiment of the present invention, from the brush plate side, with a partially cutaway view of a brush box.
Figure 6:
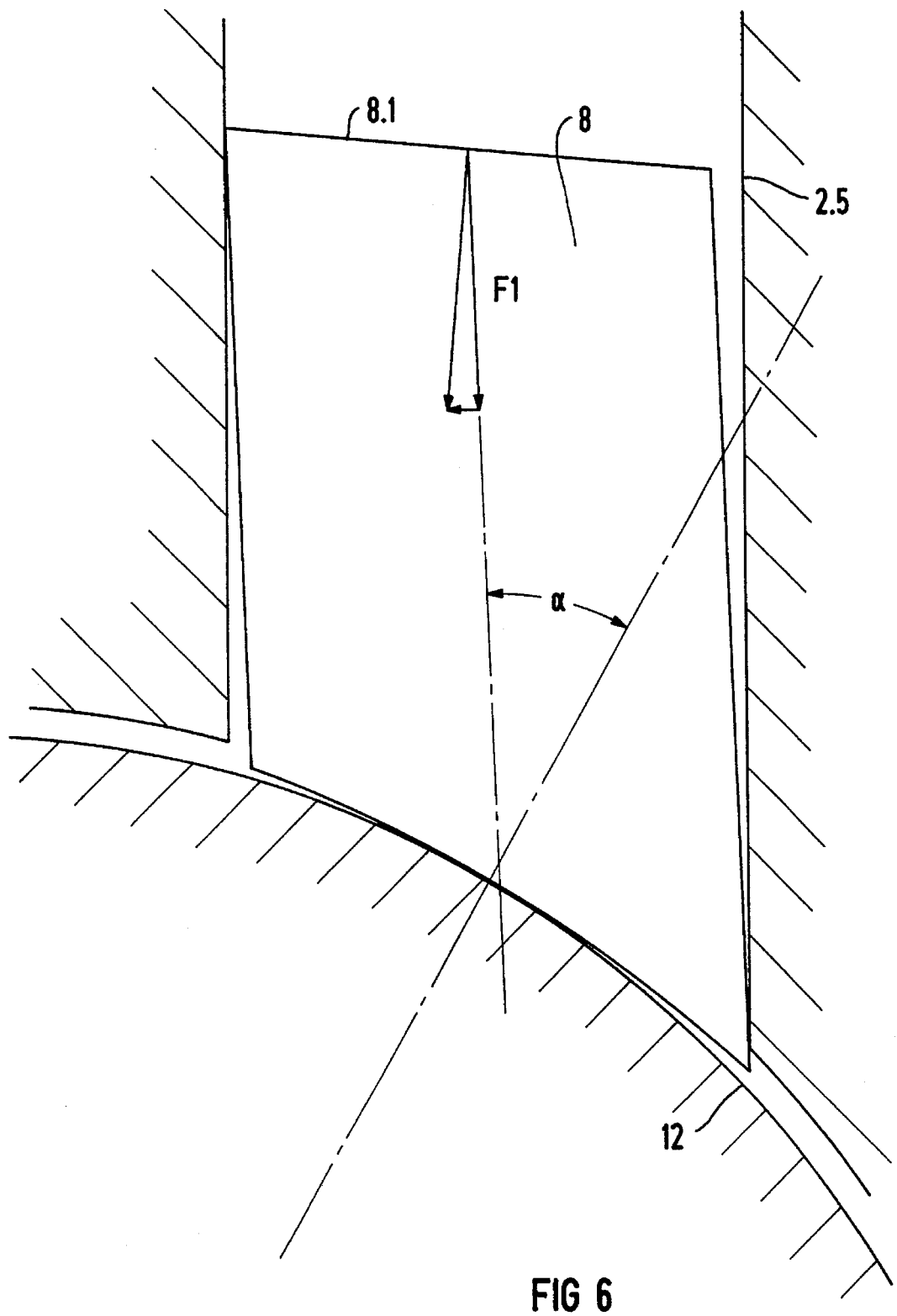
FIG. 6 shows the diagonal positioning of a brush in the brush box relative to the commutator.

A brush mount according to an embodiment of the present invention consists essentially of two components, namely a base 3 lockable in a motor housing 1 (FIG. 3) and a brush plate 2, mounted with an intermediate damping element between it and base 3. Brush plate 2 essentially has the sole purpose of holding and guiding brushes 8 and 9 which rub on a commutator 12 (brush 9 is illustrated in FIG. 1, brush 8 is illustrated in FIGS. 1, 2 and 6, and commutator is illustrated in FIG. 6). In addition, brush boxes 2.5 and 2.6, integral with brush plate 2, are made in the form of components of brush plate 2 as can be seen from the section in FIG. 1. The boxes can be injection-molded from plastic and are closable radially by a lockable lid following insertion of the brush springs. Otherwise they are closed one-piece components of brush plate 2. An annular brush mounting holder is injection-molded on brush plate 2 by means of connecting ribs that can be broken out in such manner that the brushes, which rest against its outer circumference when the commutator is inserted, are initially raised, then, following the breaking out and ejection of the brush mounting holder, they are pressed through the commutator, which pushes back axially in the opposite direction during assembly against its brush rubbing surface by the brush springs.

Figure 3:
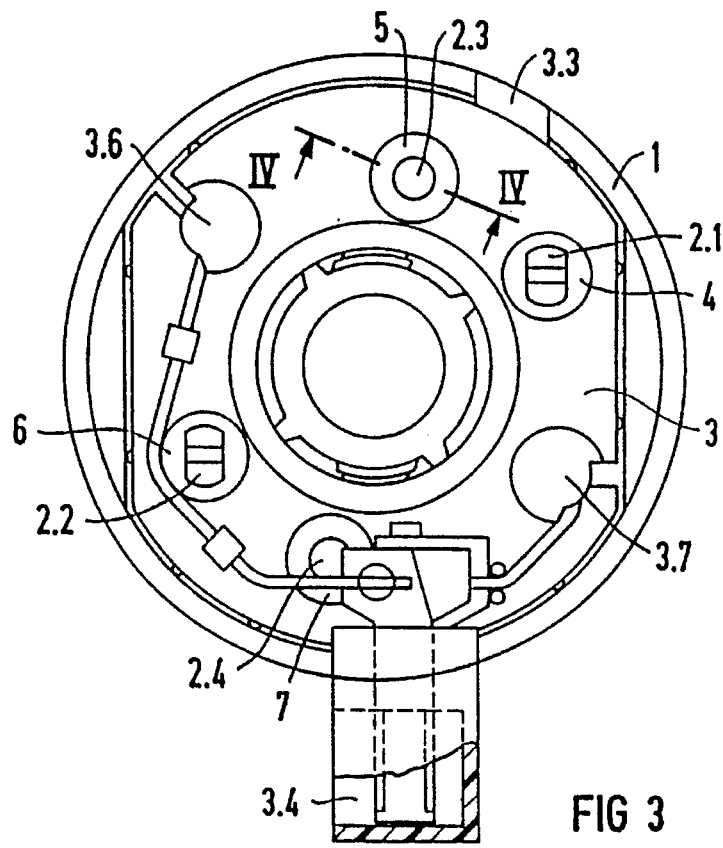
FIG. 3 shows a top view of the brush mount from the base side, with a partially cutaway view of a connector housing molded on the base.
Figure 5:
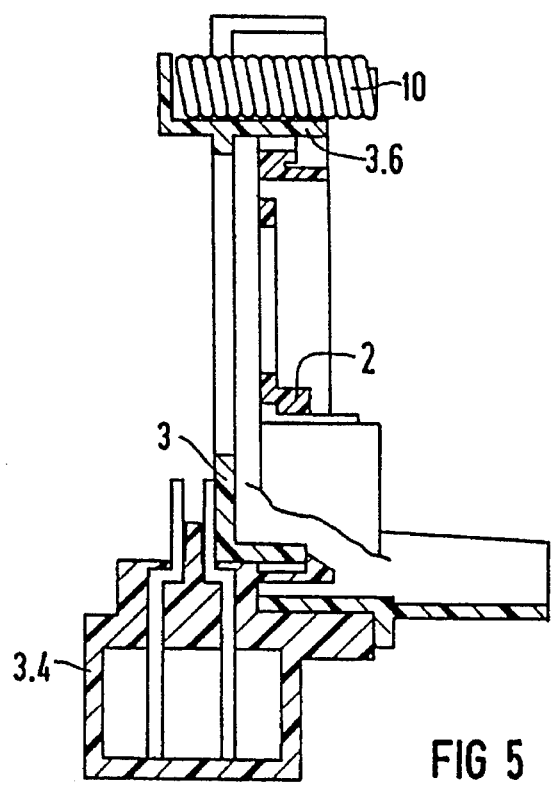
FIG. 5 shows the brush mount in a cross section along line V—V in FIG. 1.

For opposing mounting of brush plate 2 and base 3, laterally elastically flexible locking pins 2.1 and 2.2 are molded on brush plate 2. These pins are lockable or snappable into corresponding locking openings 3.1 in base 3 for the purpose of axial mounting assembly. Damping sleeves 4 and 6 are interposed between the plate and base. Axially projecting guide pins 2.3 and 2.4 are also molded on brush plate 2, specifically for radial and tangential alignment between brush plate 2 and base 3, said pins in turn being insertable, using the same assembly technique, into corresponding guide openings 3.2 (FIG. 4), with interposition of damping sleeves 5 and 7 (FIG. 3).

Figure 4:
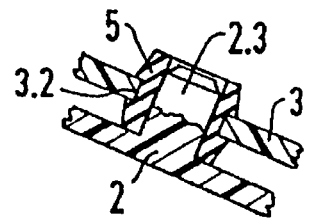
FIG. 4 shows a detailed section along line IV—IV in FIG. 3.

Advantageously, damping sleeves 4–7 are held in premountable fashion in locking openings 3.1 and guide openings 3.2 of base 3; for this purpose, as is particularly evident in FIG. 2 and FIG. 4, undercuts in the outer edges of damping sleeves 4-7 snap into the edges of locking opening 3.1 or guide opening 3.2.

The minimum distance between brush plate 2 and base 3 is determined by the length of the spacing of the locking connection of locking pins 2.1 and 2.2; because damping sleeves 4-7 are provided as axial spacers between brush plate 2 and base 3, a controlled pretensioning of damping sleeves 4-7 in the area between brush plate 2 and base 3 is achieved by selecting the locking length of locking pins 2.1 and 2.2 and thus a desired specific damping is ensured between the otherwise mutually spaced components of brush plate 2 and base 3.

Base 3, in addition to actual mounting of the entire brush mount in motor housing 10 also serves to receive additional electronic or electrical components, especially suppression capacitors 10 and 11 insertable axially into pockets 3.6 and 3.7. Suppression capacitors 10 and 11 are connected firstly by electrical leads with brushes 8 and 9 and secondly with a connector housing 3.4 molded on base 3, said housing projecting through an opening in motor housing 1. Connector housing 3.4 therefore simultaneously serves in the manner of an approximately opposite positioning projection 3.3 for tangential and axial immobilization of base 3 and hence for the entire brush mount relative to motor housing 1. On the outer circumference of the base, a plurality of scraping ribs 3.5 are provided for premounting. The ribs ensure radially positive and axially nonpositive retention when the brush mount is inserted axially into motor housing 1. The base is mounted permanently on a stator point of the commutator motor without a damping insert. The damping insert is instead provided between the base 3 and brush plate 2.

As is particularly evident from FIG. 1 and shown enlarged in schematic form in FIG. 6, the brush is inclined, with respect to its perpendicular to the surface of the commutator, by an angle α, preferably equal to 30°, and with a bevel at one end, 8.1, such that it remains in a fixed position, with its commutator end abutting one (the right) side wall of brush box 2.5 and with its head end abutting the other (left) side wall of brush box 2.4, due to the force F1 of a brush spring acting an beveled end 8.1 and the frictional force between brush and commutator 12, independently of the rotational direction of commutator 12.

What is claimed is:

1. In a small commutator, motor having a motor housing, a noise-damped brush mount comprising:

a base permanently mounted on said motor housing, said base having a connector housing molded thereon which is connected to at least one of electronic and electrical components;

a brush plate mounted on said base with a damping insert located between said brush plate and said base;

two brush boxes mounted directly on said brush plate; and two brushes, one of said two brushes respectively mounted in each of said two brush boxes.

2. The mount of claim 1, wherein said brush plate and said base are lockable by at least one of opposite, preferably axially closable, locking and snap connections relative to one another, especially as regards their mutual axial spacing.

3. The mount of claim 1 wherein said brush plate and said base are alignable by opposite, preferably axially interlocking guide connections relative to one another, especially in at least one of mutual radial and tangential positions between said brush plate and said base.

4. The mount of claim 2 wherein said brush plate and said base are alignable by opposite, preferably axially interlocking guide connections relative to one another, especially in at least one of mutual radial and tangential positions between said brush plate and said base.

5. The mount of claim 2 wherein said brush plate includes axially molded, preferably laterally elastically deformable locking pins and said base includes corresponding locking openings wherein damping sleeves are interposed between said base and brush plate, fitting around said locking pins.

6. The mount of claim 4 wherein said brush plate includes axially molded, preferably laterally elastically deformable locking pins and said base includes corresponding locking openings wherein damping sleeves are interposed between said base and brush plate, fitting around said locking pins.

7. The mount of claim 3 wherein said brush plate includes solid guide pins and said base includes corresponding guide openings wherein damping sleeves are interposed between said base and brush plate fitting around said guide pins.

8. The mount of claim 4 wherein said brush plate includes solid guide pins and said base includes corresponding guide openings wherein damping sleeves are interposed between said base and brush plate fitting around said guide pins.

9. The mount of claim 6 wherein said brush plate includes solid guide pins and said base includes corresponding guide openings wherein damping sleeves are interposed between said base and brush plate fitting around said guide pins.

10. The mount of claim 5 wherein said damping sleeves are provided with a through opening for said locking pins and are premountably insertable into said locking openings.

11. The mount of claim 7 wherein said damping sleeves are provided with a through opening for said guide pins and are premountably insertable into said guide openings.

12. The mount of claim 5 wherein said damping sleeves are provided as axial spacers between the brush plate and the base.

13. The mount of claim 7 wherein said damping sleeves are provided as axial spacers between the brush plate and the base.

14. The mount of claim 10 wherein said damping sleeves are provided as axial spacers between the brush plate and the base.

15. The mount of claim 11 wherein said damping sleeves are provided as axial spacers between the brush plate and the base.

16. The mount of claim 5 wherein said damping insert is axially pretensioned between said brush plate, which rests in at least one of an opposite locking and snap connection, and said base.

17. The mount of claim 7 wherein said damping insert is axially pretensioned between said brush plate, which rests in at least one of an opposite locking and snap connection, and said base.

18. The mount of claim 1 wherein said base includes pockets to receive the at least one of electronic and electrical components.

19. The mount of claim 1 wherein a brush is guided on said brush plate with a play in its associated brush box and is mounted at an angle to a surface of a commutator of the commutator motor, the brush has a beveled head subjected to a force of a brush spring so that in view of an operational frictional force between the brushes and the surface of the commutator of the commutator motor and pressure of the brush spring, an independent rotational direction of the commutator tangentially abuts one wall of its associated brush box at an end of the commutator in a fixed position and abuts another side wall of its associated brush box at a head end.

20. The mount of claim 9 wherein said brush boxes are formed, preferably after insertion of the brushes and brush springs, as radially closable, otherwise closed one-piece components of said brush plate, wherein said brush plate is a plastic part produced by injection molding.

* * * * *